United States Patent [19]

Gilbert

[11] 4,262,857
[45] Apr. 21, 1981

[54] FISHING REEL SPOOL

[76] Inventor: Arthur E. Gilbert, P.O. Box 216, Alva, Fla. 33920

[21] Appl. No.: 933,261

[22] Filed: Aug. 14, 1978

[51] Int. Cl.³ .............................................. A01K 89/00
[52] U.S. Cl. .................................. 242/84.1 A; 242/96
[58] Field of Search ............ 242/68.3, 85.1 R, 84.1 R, 242/118.4, 96; 43/20, 21; 226/120, 123, 127, 134, 152–154; 271/118, 119; 221/259, 260; 74/242.16

[56] References Cited

U.S. PATENT DOCUMENTS

| | | | |
|---|---|---|---|
| 1,351,549 | 8/1920 | Benson | 242/84.1 R X |
| 1,398,185 | 11/1921 | Frohmuth et al. | 242/84.1 |
| 1,827,488 | 10/1931 | Roach | 242/84.1 R |
| 2,150,477 | 3/1939 | Wright | 242/84.1 |
| 2,404,702 | 7/1946 | Fiori | 242/96 |
| 2,425,492 | 8/1947 | Severson | 242/84.1 R |
| 2,655,756 | 10/1953 | Polis | 43/20 |
| 2,942,599 | 6/1960 | Irgens | 123/185 BA |
| 3,411,686 | 11/1968 | Bender | 226/185 |
| 3,814,073 | 6/1974 | Nakatani | 123/185 A |
| 4,084,807 | 4/1978 | Terajima et al. | 271/119 |

FOREIGN PATENT DOCUMENTS 115445 7/1942 Australia .............................. 242/84.1 R
4936 of 1904 United Kingdom .................... 242/84.4

Primary Examiner—Leonard D. Christian
Attorney, Agent, or Firm—Hauke and Patalidis

[57] ABSTRACT

A fishing reel having a non-circular winding surface on which the fishing line is wound. The non-circular winding surface provides uneven pull on the line during retrieving of the bait attached to the end of the line, thus causing the bait to be pulled through the water with a realistic uneven motion or "action" which readily attracts fish.

10 Claims, 6 Drawing Figures

FISHING REEL SPOOL

BACKGROUND OF THE PRESENT INVENTION

The present invention relates to fishing implements and more particularly to line-winding spools for fishing reels. Various types of fishing reels have been in common use for a number of years, more particularly casting reels of the "level wind" type and variations thereof with elaborate mechanisms whereby the line is guided to wind evenly around a rotating spool, and others, such as spinning reels, provided with a winding line guide rotatable around a non-rotating spool, but all have been designed with spools which are substantially circular in cross-section.

Through experience, fishermen have discovered that they are far more likely to hook the mouth of a hungry fish if the bait at the end of their fishing line moves in a life-like and hence somewhat erratic or non-even manner during retrieval of the bait. In order to obtain this motion, a few fishermen have resorted to mechanized bait. Other fishermen obtain some of the desired "action" by either shaking or oscillating the fishing rod while retracting the line or by rotating the crank of the winding reel in an uneven manner.

It therefore would be useful to provide a means to cause the bait to be displaced through the water with an uneven or erratic motion by means of an inexpensive mechanism built into the spool itself or easily added to the spool of an existing fishing reel requiring only constant rotation of the crank.

SUMMARY OF THE INVENTION

The present invention provides an inexpensive means to retrieve a fishing line by winding the line on a fishing reel such as to cause a constantly variable pull to be exerted on the line to produce a life-like motion of the bait. These results are achieved by means of a spool which has been provided with a substantially non-constant effective radius, by shaping the spool with, for example, a triangular or an elliptical cross-section, or alternatively, mounting a circular or non-circular spool eccentrically.

The fishing reel spool of the present invention may be used to replace the spool, or the spool and shaft, of an existing conventional fishing reel or, alternatively, it may take the form of an adaptor removably fitted around the spool of a conventional reel.

The objects and advantages of the present invention will become apparent to those skilled in the art when the following description of the best modes contemplated for practicing the invention is read in conjunction with the accompanying drawing wherein:

DETAILED DESCRIPTION OF THE PREFERRED EMBODIMENTS

Figure 1:
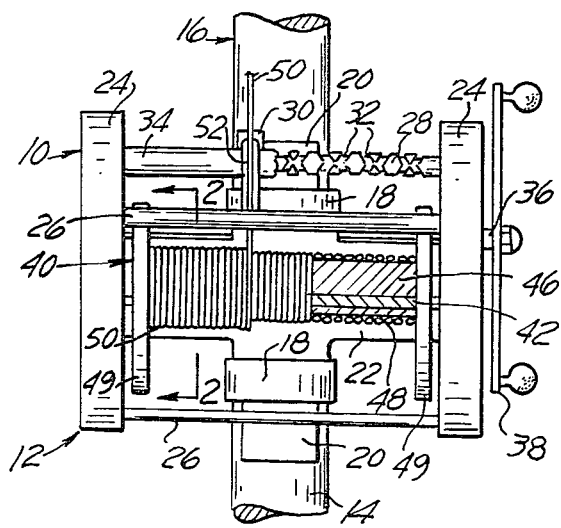
FIG. 1 is a partially cut-away elevational view of an example of a level wind reel modified in accordance with the present invention.

Referring first to FIG. 1, a conventional level wind type fishing reel 10 is illustrated as modified in accordance with the present invention. The fishing reel 10 comprises a frame 12 and is secured to the handle 14 of a fishing rod 16, for example by means of two clamping rings 18 each of which surrounds the fishing rod handle 14 and one of two flanges 20 of a T-shaped bracket 22 mounted to one side of the support frame 12. The support frame 12 comprises two side housings 24 rigidly inter-connected by cross-member rods 26.

A line guide actuating shaft 28 is rotatably supported between the two side housings 24 parallel to the cross-member rods 26 proximate the periphery of the frame 12. A line guide block 30 is mounted around the shaft 28 and caused to translate back and forth along the length of the actuating shaft 28 by means of a pawl (not shown) engaged in a double helical groove 32 cut in the peripheral surface of the actuating shaft 28. A U-shaped shield 34, illustrated partly cut-away at FIG. 1 to show the double helical groove 32, is mounted between the side housings 24 to surround most of the actuating shaft 28 and prevent the line guide block 30 from rotating around the shaft 28.

The line guide block 30 is coupled through a set of gears (not shown) within one of the side housings 24 to be driven by a stub shaft 36 projecting through a side housing 24. A crank handle 38 is fastened to the projecting end of the stub shaft 36 on the outside of the frame 12. The stub shaft 36 is also coupled through a set of gears (not shown) to a spool assembly 40 rotatably mounted between the side housings 24 proximate the center of frame 12.

Figure 2:
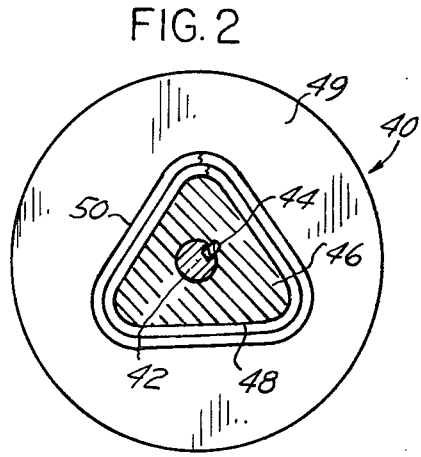
FIG. 2 is a cross-sectional view, at an enlarged scale, through line 2—2 of FIG. 1 showing the spool thereof.

The spool assembly 40 may, for example, as shown in FIG. 2, consist of a shaft 42 keyed by key 44 to a spool 46 provided with side flanges 49. Unlike the spool assembly of a conventional level winding reel which has a cylindrical spool defining a circular winding surface, the spool assembly 40 of the present invention has a non-cylindrical spool 46 defining a non-circular line winding surface 48, FIG. 2. One end of a fishing line 50 is wrapped around the spool 46 as in a conventional reel. The other end of the line 50 is fed through a wire line guide 52 attached to the line guide block 30 and out along the fishing pole through a series of eyelets disposed along the length of the pole and terminating in a free end to which a lure, or baited hook is attached (not shown).

In operation, the line 50 may be retrieved by manual rotation of the crank handle 38, thereby simultaneously rotating the line winding spool 46 and translating the line guide block 30. As the spool 46 retrieves the line 50 it is guided by the line guide 52 to wind evenly around the periphery and along the length of the spool 46. The non-circular winding surface 48 of the spool 46 retrieves more line when its radius is large than when its radius is small, for a given arc of rotation, thus causing an oscillation of the speed at which the line is wrapped around the spool 46, and thereby pulling the bait at the end of the line 50 through the water in a somewhat life-like non-even manner.

Figure 3:
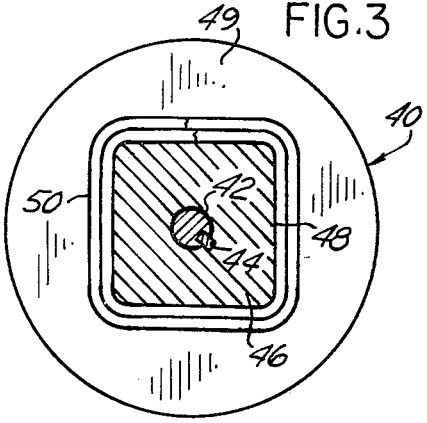
FIGS. 3 and 4 are views similar to FIG. 2, but showing examples of modifications thereof.

FIGS. 2 and 3 illustrate examples of non-cylindrical winding surfaces 48 for the spool 46 in accordance with the present invention. The triangular cross-section shown at FIG. 2, for example, results in three accelerations of the line, and therefore, three tugs on the bait for each complete revolution of the shaft 42 supporting the spool 46. Similarly, the square winding surface 48 of the spool 46 shown at FIG. 3 tugs on the bait four times for each full revolution of the shaft 42 supporting the spool 46. The acceleration of the line 50 and, therefore, the amount of force exerted on the bait is less for the square winding surface than it is for the triangular winding surface. It will be appreciated that other higher order polygonal cross-sections can be used to produce various periods of oscillation of the line, but that as the number of polygonal faces increases, the winding surface 48 becomes closer and closer to being circular and the oscillating motion of the bait becomes less and less pronounced, until finally, the friction of the water and the elasticity of the line are sufficient to completely dampen out the oscillations.

Figure 4:
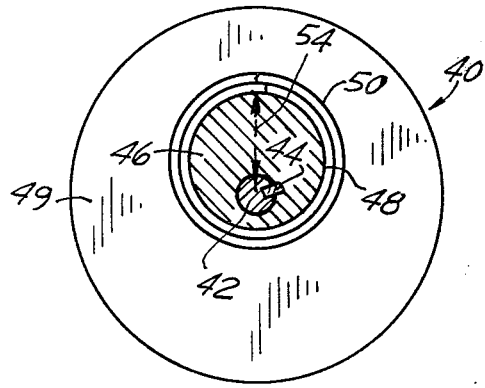

FIG. 4 illustrates an eccentrically mounted cylindrical spool 46. As the spool assembly 40 is rotated, the line 50 accelerates and decelerates once for each complete revolution, moving the bait fastest when the effective radius 54 of the spool is greatest.

Figure 5:
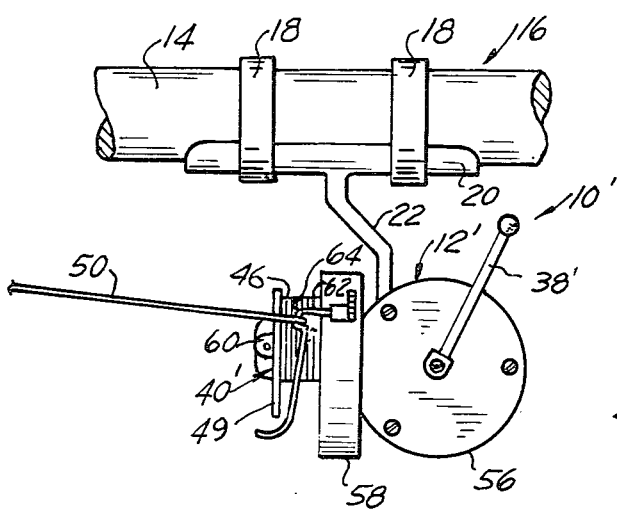
FIG. 5 is an elevational view of a spinning reel modified in accordance with the present invention.

The present invention may be incorporated in other types of fishing reels as, for example, the spinning reel 10' shown in FIG. 5. The frame 12' of the fishing reel 10' comprises a first closed circular housing 56 and a second open circular housing 58 mounted perpendicularly to the first housing 56. The spool assembly 40' is secured in the housing 58 on a shaft (not shown) by means of a wing nut 60. A line guide curved arm 62 is mounted on the periphery of the housing 58.

As is well known in the art, rotation of the crank 38' mounted on the housing 56 simultaneously causes the housing 58 to rotate and the spool assembly 40' to reciprocate along its axis through a system of gears (not shown) within the housing 56. As the housing 58 rotates, the line guide arm 62 intercepts the free end of the line 50 and traps it in a slot 64 proximate the edge of the housing 58, guiding it to wind evenly around the spool 46. The simultaneous translation of the spool assembly 40' along its axis causes the line 50 to wrap evenly along the entire length of the spool 46. Providing the spool 46 with a non-cylindrical winding surface 48, as shown at FIGS. 2 and 3, or with an eccentric circularly cylindrical surface 48, as shown at FIG. 4 results in a variation in the speed at which the line 50 is pulled through the guide slot 64 as each turn of line is wound around the spool, and thus a variation in the speed at which the lure or bait attached to the free end of the line 50 is pulled through the water.

Figure 6:
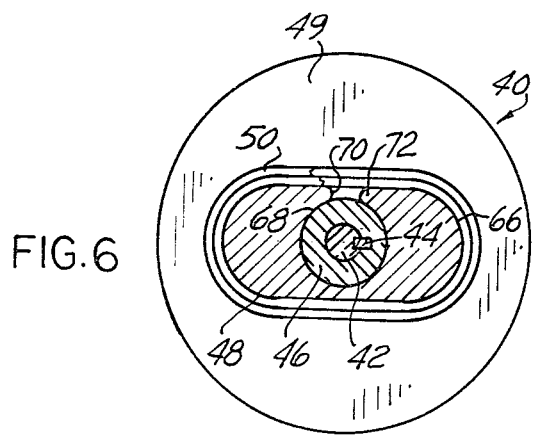
FIG. 6 is a further modification of the spools of FIGS. 2-4.

As shown in FIG. 6, the present invention contemplates that the non-circular cylindrical winding surface for a fishing reel spool may take the form of an adaptor 66 and be provided with an elongated longitudinal slit 70 permitting to snap fit the adaptor around the cylindrical winding surface 68 of a conventional spool 46.

The adaptor 66, preferably made of a resilient plastic material, has an outer surface defining the desired noncircular line winding surface 48. The adaptor 66 is generally tubular and has inner diameter slightly smaller than the outer diameter of the spool 46 for pressure frictional engagement therewith. The longitudinal slit 70 is of sufficient width and is provided with tapered or rounded parallel edges 72 to easily engage and snap around the periphery of the spool.

Sets of adaptors or sets of replacement spools may be provided to permit a fisherman to obtain the particular type of action of bait or lure that is most desirable. For example, a fairly even oscillating pull may be applied to the line by use of polygonal winding surfaces, such as those shown in FIGS. 3 and 4 or by the eccentrically mounted circular winding surface, as shown at FIG. 4. Alternatively, if it is desired to have almost no motion of the line for a short period and then a sudden pull followed by another short period of little motion, a pie-shaped or an extreme ellipse winding surface may be used. Use of non-circular cross-sectioned spools or adaptors mounted eccentrically provide still more varied types of pulsating pulls.

Having thus described the present invention by way of practical embodiments thereof, modifications whereof will be apparent to those skilled in the art, what is claimed as new is as follows:

I claim:

1. In a fishing reel adapted to play a fishing line by unwinding said line from a spool and to retrieve said line by winding said line on said spool, an adaptor comprising a line winding peripheral surface on the exterior surface of said adaptor presenting a periodically variable radius of wind to said line for each turn of line wound about said spool, said adaptor fitting over said spool.

2. The improvement of claim 1 wherein said adaptor has a non-circular cross-section.

3. The improvement of claim 1 wherein said spool has a polygonal cross-section.

4. The improvement of claim 1 wherein said spool has an oblong cross-section.

5. The improvement of claim 1 wherein said adaptor has a circular cross-section and said spool is mounted in said reel eccentrically relative to the center of said spool.

6. The improvement of claim 1 wherein said spool is mounted in said reel eccentrically relative to the center of wind of said line.

7. The improvement of claim 1 further comprising an adaptor wherein said line winding surface is the peripheral surface of an adaptor removably fitted over a conventional spool.

8. The improvement of claim 1 wherein the outer surface of said adaptor defines a parallelepiped.

9. The improvement of claim 1 wherein the outer surface of said adaptor defines a non-circular cylinder.

10. In a fishing reel comprising a crank, a spool coupled to said crank and having a line winding peripheral surface, a fishing line wound around the line winding peripheral surface of said spool, said reel being adapted to rapidly play said line by unwinding said line from said spool and to retrieve said line by winding said line on said spool, the improvement comprising means imparting a mild vibratory motion to said line and comprising said line winding peripheral surface of said spool having a moderately non-circular shape in cross-section and a substantially uniform perimeter from end to end of said spool.

* * * * *

UNITED STATES PATENT AND TRADEMARK OFFICE
CERTIFICATE OF CORRECTION

PATENT NO. : 4,262,857
DATED : April 21, 1981
INVENTOR(S) : ARTHUR E. GILBERT

It is certified that error appears in the above-identified patent and that said Letters Patent are hereby corrected as shown below:

Column 4, lines 32 - 62, omit, and insert the following:

3. The improvement of claim 1 wherein said adaptor has a circular cross-section and said spool is mounted in said reel eccentrically relative to the center of said spool.

4. The improvement of claim 1 wherein the outer surface of said adaptor defines a parallelepiped.

5. The improvement of claim 1 wherein the outer surface of said adaptor defines a non-circular cylinder.

6. In a fishing reel comprising a crank, a spool coupled to said crank and having a line winding peripheral surface, a fishing line wound around the line winding peripheral surface of said spool, said reel being adapted to rapidly play said line by unwinding said line from said spool and to retrieve said line by winding said line on said spool, the improvement comprising means imparting a mild vibratory motion to said line and comprising said line winding peripheral surface of said spool having a moderately non-circular shape in cross-section and a substantially uniform perimeter from end to end of said spool.

7. The improvement of claim 6 wherein said spool has a polygonal cross-section.

UNITED STATES PATENT AND TRADEMARK OFFICE
CERTIFICATE OF CORRECTION

PATENT NO. : 4,262,857

DATED : April 21, 1981

INVENTOR(S) : ARTHUR E. GILBERT

It is certified that error appears in the above-identified patent and that said Letters Patent are hereby corrected as shown below:

8. The improvement of claim 6 wherein said spool has an oblong cross-section.

9. The improvement of claim 6 wherein said spool is mounted in said reel eccentrically relative to the center of wind of said line.

10. The improvement of claim 6 further comprising an adaptor wherein said line winding surface is the peripheral surface of an adaptor removably fitted over a conventional spool.

Signed and Sealed this

Tenth Day of August 1982

[SEAL]

Attest:

GERALD J. MOSSINGHOFF

Attesting Officer     Commissioner of Patents and Trademarks